(12) United States Patent
Berry et al.

(10) Patent No.: US 11,993,495 B1
(45) Date of Patent: May 28, 2024

(54) AERIAL DEVICE

(71) Applicant: Altec Industries, Inc., Birmingham, AL (US)

(72) Inventors: Robert A. Berry, Fincastle, VA (US); Johnson X. Miles, Daleville, VA (US); David F. Lindquist, Cameron, MO (US)

(73) Assignee: Altec Industries, Inc., Birmingham, AL (US)

(*) Notice: Subject to any disclaimer, the term of this patent is extended or adjusted under 35 U.S.C. 154(b) by 0 days.

(21) Appl. No.: 18/380,486

(22) Filed: Oct. 16, 2023

(51) Int. Cl.
*G06F 17/00* (2019.01)
*B66F 11/04* (2006.01)
*F16B 7/18* (2006.01)

(52) U.S. Cl.
CPC ............. *B66F 11/044* (2013.01); *F16B 7/182* (2013.01)

(58) Field of Classification Search
CPC ................................ B66F 11/044; F16B 7/182
USPC ........................................................ 182/63.1
See application file for complete search history.

(56) References Cited

U.S. PATENT DOCUMENTS

| | | | |
|---|---|---|---|
| 3,791,484 A | 2/1974 | Harrison | |
| 4,044,856 A * | 8/1977 | Stevenson | B66F 11/044 182/2.4 |
| 8,443,936 B1 | 5/2013 | Raymond | |
| 8,857,567 B1 | 10/2014 | Raymond | |
| 10,662,046 B1 * | 5/2020 | Engebretson | B66F 9/0655 |
| 10,926,986 B2 * | 2/2021 | Parot | B66F 17/006 |
| 11,247,886 B2 * | 2/2022 | Fritel | B66F 11/046 |
| 11,524,720 B2 * | 12/2022 | Tranchero | B62D 17/00 |
| 11,613,857 B2 * | 3/2023 | Cronk | E01D 15/127 14/2.4 |
| 11,673,783 B1 * | 6/2023 | Brunk, III | B66F 11/046 182/63.1 |
| 2003/0173151 A1 | 9/2003 | Bodtke et al. | |
| 2011/0007157 A1 | 1/2011 | Sekelsky et al. | |
| 2012/0211301 A1 | 8/2012 | Clark et al. | |
| 2018/0195589 A1 | 7/2018 | Mark | |
| 2020/0148510 A1 | 5/2020 | Rauscher et al. | |

FOREIGN PATENT DOCUMENTS

WO WO-2004100206 A1 * 11/2004 ......... G01N 23/2204

OTHER PUBLICATIONS

Aerial Devices With Insulating Boom Used for Live Working (Year: 2001).*
U.S. Appl. No. 18/380,510 Office Action dated Jan. 2, 2024.

* cited by examiner

*Primary Examiner* — Ronnie M Mancho
(74) *Attorney, Agent, or Firm* — Erise IP, P.A.

(57) ABSTRACT

An aerial device for operating on energized powerlines is disclosed. The aerial device may have a boom assembly with a lower, electrically non-insulating boom section coupled to an upper, electrically insulating boom section. The lower and upper boom sections may be coupled by a pinned connection that utilizes structural collars and structural pins to handle loads applied to the upper boom section. The upper boom section may articulate relative to the lower boom section using a 4-bar mechanism employing a split pivot pin that enables a greater range of motion for the articulation. A modular sled that can be coupled to various boom assemblies is also disclosed.

20 Claims, 15 Drawing Sheets

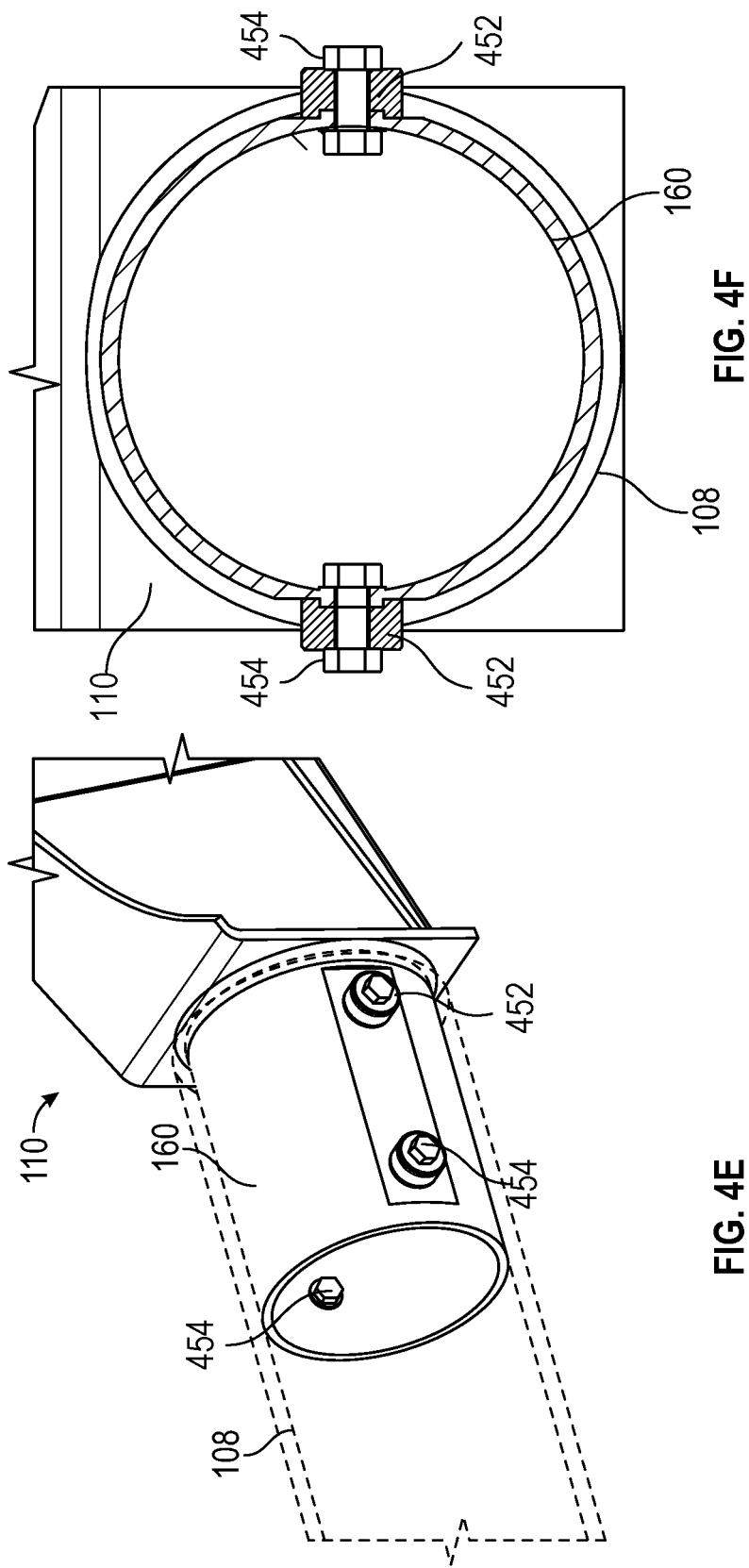

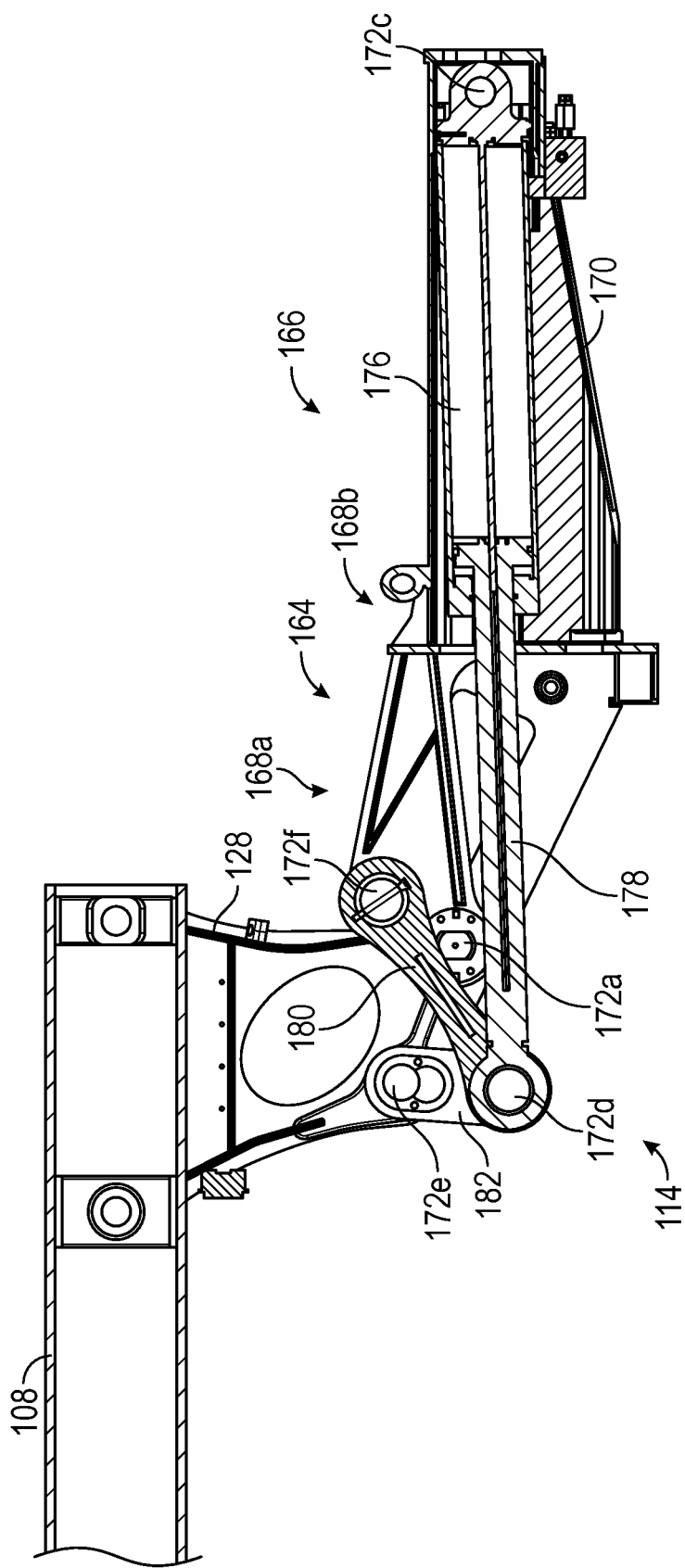

AERIAL DEVICE

BACKGROUND

1. Field

Embodiments of the present disclosure relate to aerial devices. More specifically, embodiments of the present disclosure relate to pinned connections for aerial devices between insulating and non-insulating boom sections, articulation between boom sections, and modular boom section components.

2. Related Art

Aerial devices for working on energized power lines generally comprise a lower, electrically non-insulating boom section, and an upper, insulating boom section such that a dielectric gap is created to enable linemen to work on the energized power lines. The lower boom section is generally formed of a metal, such as steel, while the upper boom section is generally formed of a composite, such as fiberglass. Typically, to connect the lower boom section to the upper boom section, an array of fasteners is match drilled through the two sections where the two sections are joined, and a structural adhesive is added between the two sections. When adhesives are used, a permanent connection is created such that any damage to the boom assembly requires replacement of the entire assembly. Furthermore, the use of adhesives is undesirable from a manufacturing and assembling standpoint due to the long cure and preparation times associated with using the adhesives.

When a boom assembly is not in use, the lower and upper boom sections are typically placed in a stowed (e.g., folded) position for travel between worksites. To deploy the boom assembly to a working position, a joint between the lower and upper boom sections is articulated to unfold the sections. Improvements in articulating joints for boom assemblies are needed.

A distalmost stage of the lower boom section may house hydraulics and sensors that are connected to the upper boom section. Access to the hydraulics and sensors is generally provided through a small access point that is difficult to access and work through. Improvements in the boom sections that house hydraulics and sensors that are connected to the upper boom section are needed.

SUMMARY

Embodiments of the present disclosure solve the above-mentioned problems by providing pinned connections, articulating joints, and modular sleds for boom sections for aerial devices. The boom assembly may comprise an insulating section and a non-insulating section. The insulating section may be connected to the non-insulating section via a connecting assembly. The connecting assembly may comprise a structural member connected at a lower end to the non-insulating section and at an upper end to the insulating section by way of a pinned connection. Structural collars may be inserted into the insulating section or may be coupled to an exterior off the insulating section. At the upper end of the structural member, structural pins may extend through the structural member, the insulating section, and the structural collars. The pinned connection may handle shear and moment loads applied to the boom assembly and may eliminate the need for a permanent connection between the insulating section and the non-insulating section. Loads applied to the insulating section may be transferred from the load section to the collars, from the collars to the structural pins, and from the structural pins to the structural member.

In some embodiments, the techniques described herein relate to a boom assembly for an aerial device, including: a lower, non-insulating section; an upper, insulating section; and a connecting assembly connecting the lower, non-insulating section to the upper, insulating section, including: a front collar and a rear collar received within the upper, insulating section; a structural member having a first plate opposing a second plate, both the first plate and the second plate including: a lower end coupled to the lower, non-insulating section and an upper end coupled to the upper, insulating section, and a front bore and a rear bore located on the upper end, wherein the first plate and the second plate are separated at the upper end by an opening, the opening configured to receive a portion of the upper, insulating section therein; and a front pin extending through the front bore on the first plate, across the front collar and the upper, insulating section, and through the front bore on the second plate; and a rear pin extending through the rear bore on the second plate, across the rear collar and the upper, insulating section, and through the rear bore on the second plate.

In some embodiments, the techniques described herein relate to a boom assembly, wherein moment loads and shear loads applied to the upper, insulating section are transferred from the upper, insulating section to the front collar and the rear collar, from the front collar and the rear collar to the front pin and the rear pin, respectively, and from the front pin and the rear pin to the structural member.

In some embodiments, the techniques described herein relate to a boom assembly, wherein the front collar is pivotable about the front pin.

In some embodiments, the techniques described herein relate to a boom assembly, wherein the upper, insulating section includes a proximal end coupled to the connecting assembly and a distal end coupled to a boom tip of the boom assembly, and wherein the distal end includes a bore receiving at least a portion of the boom tip therein, and at least one distal end pin received through the distal end to react to loads applied to the distal end of the upper, insulating section.

In some embodiments, the techniques described herein relate to a boom assembly, wherein the front pin is separated from the upper, insulating section by a gap to prevent direct contact between the upper, insulating section and the front pin.

In some embodiments, the techniques described herein relate to a boom assembly, wherein the upper, insulating section forms a close fit with the rear pin.

In some embodiments, the techniques described herein relate to a boom assembly, further including: a plurality of fasteners extending through the upper, insulating section and at least partially into the rear collar, the plurality of fasteners configured to resist torsional loads and axial loads applied to the upper, insulating section.

In some embodiments, the techniques described herein relate to a connecting assembly for coupling a non-insulating boom section to an insulating boom section on an aerial device, the connecting assembly including: a front collar and a rear collar coupled to the insulating boom section; a structural member, including: a first plate and a second plate separated by an opening, the opening configured to receive a portion of the insulating boom section therein, wherein the first plate and the second plate include: an upper end having a front bore and a rear bore, the upper end coupled to the insulating boom section; and a lower end coupled to the non-insulating boom section; and a front pin extending through the front bore of the first plate, through the front collar and the insulating boom section, and through the front bore of the second plate; and a rear pin extending through the rear bore of the first plate, through the rear collar and the insulating boom section, and through the rear bore of the second plate.

In some embodiments, the techniques described herein relate to a connecting assembly, wherein the insulating boom section is not in direct contact with the front pin or the rear pin.

In some embodiments, the techniques described herein relate to a connecting assembly, wherein the front collar is pivotable about the front pin.

In some embodiments, the techniques described herein relate to a connecting assembly, further including a plurality of fasteners inserted through the insulating boom section and into the rear collar, the plurality of fasteners configured to resist torsional loads and axial loads from the insulating boom section.

In some embodiments, the techniques described herein relate to a connecting assembly, wherein the front collar and the rear collar form a close fit with the insulating boom section.

In some embodiments, the techniques described herein relate to a connecting assembly, wherein the front collar and the rear collar are coupled to an exterior surface of the insulating boom section.

In some embodiments, the techniques described herein relate to a connecting assembly, wherein the insulating boom section forms a close fit with the rear pin.

In some embodiments, the techniques described herein relate to an aerial device, including: a boom assembly including: a lower boom section; an upper boom section; and a connecting assembly connecting the lower boom section to the upper boom section, the connecting assembly including: a structural frame coupled at a lower end to the lower boom section and at an upper end to the upper boom section; at least one collar coupled to a proximal end of the upper boom section; and at least one pin extending through the structural frame, the proximal end of the upper boom section, and the at least one collar.

In some embodiments, the techniques described herein relate to an aerial device, wherein the at least one collar includes a front collar and a rear collar, and wherein the at least one pin includes: a front pin extending through the structural frame, the upper boom section, and the front collar, and a rear pin extending through the structural frame, the upper boom section, and the rear collar.

In some embodiments, the techniques described herein relate to an aerial device, wherein the front collar and the rear collar are coupled to an exterior of the upper boom section.

In some embodiments, the techniques described herein relate to an aerial device, wherein moment loads and shear loads applied to the upper boom section are transferred from the upper boom section to the front collar and the rear collar, from the front collar and the rear collar to the front pin and the rear pin, respectively, and from the front pin and the rear pin to the structural frame.

In some embodiments, the techniques described herein relate to an aerial device, wherein the upper boom section includes an insulating material.

In some embodiments, the techniques described herein relate to an aerial device, further including: a boom tip coupled to a distal end of the upper boom section, wherein the distal end includes a bore, and at least one distal end pin extending through the upper boom section, the boom tip, and the bore to couple the boom tip to the distal end of the upper boom section.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 4E illustrates a third connection for the composite-steel interface at the boom tip for some embodiments;

FIG. 4F illustrates a cross-sectional view of the third connection for the composite-steel interface at the boom tip for some embodiments;

FIG. 5C illustrates of the articulating joint in a working position for some embodiments;

Figure 1A:
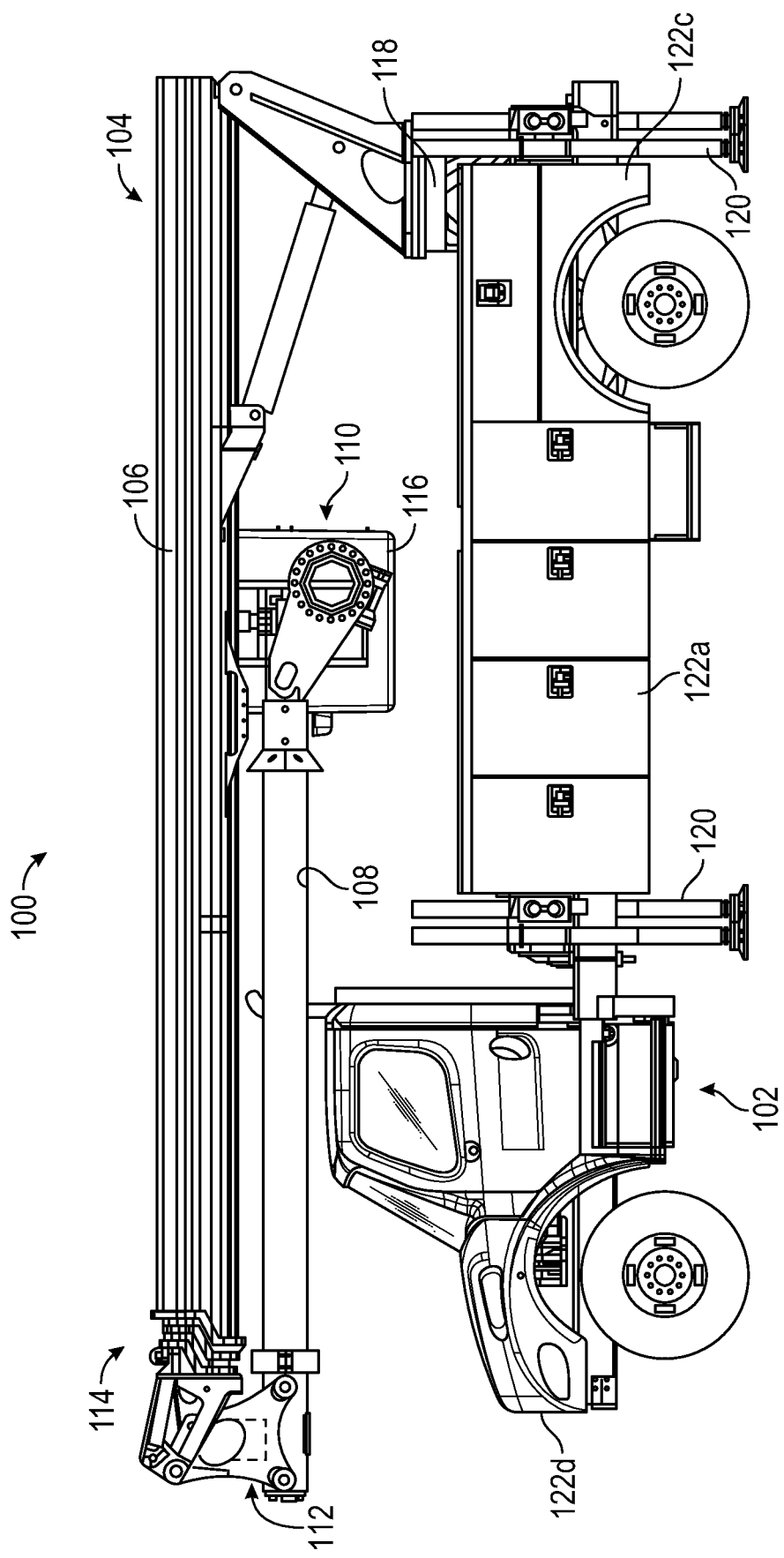
FIG. 1A illustrates an aerial device in a stowed position for some embodiments.

The drawing figures do not limit the present disclosure to the specific embodiments disclosed and described herein.

The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure relate to aerial devices and connections between insulating and non-insulating sections of aerial devices. Embodiments of the present disclosure also relate to articulating joints for aerial devices. Additionally, embodiments of the present disclosure relate to a sled apparatus for housing portions of a hydraulic system for the aerial device that may be interchangeable with multiple different aerial devices. Embodiments of the present disclosure may provide for more compact and lighter weight aerial devices, among other benefits.

An aerial device may comprise a boom assembly having an upper boom section and a lower boom section. The lower boom section may be connected to a supporting structure, such as a utility vehicle, at a proximal end. The lower boom section may be formed of a non-electrically insulating material, such as steel, while the upper boom section may be formed of an electrically insulating material, such as fiberglass or other composite, thereby enabling operations on energized power lines, for example. The lower boom section may be coupled to the upper boom section by way of a connecting assembly that handles the transition between the distinct composite and the steel materials. The differing material properties of the composite and the steel may require a joint that can adequality react to the loads applied to the composite.

The connecting assembly may comprise a supporting structure (also referred to as a pistol) having a lower end connected to the lower boom section and an upper end coupled to the upper boom section. At the upper end, the supporting structure may be coupled to the upper boom assembly using structural pins extending through the supporting structure and the upper boom section. Within the upper boom section, structural collars (also referred to as inserts) may be inserted that are a close fit with an inner surface of the upper boom structure. In some embodiments, the collars are coupled to an exterior of the upper boom surface. A structural pin may extend through each structural collar. Loads applied to the upper boom assembly may be transferred to the collars, and from the collars to the pins. The pinned connecting assembly may obviate the use of adhesives often used when connecting a steel structure to a composite structure.

Aerial Device

Figure 1B:
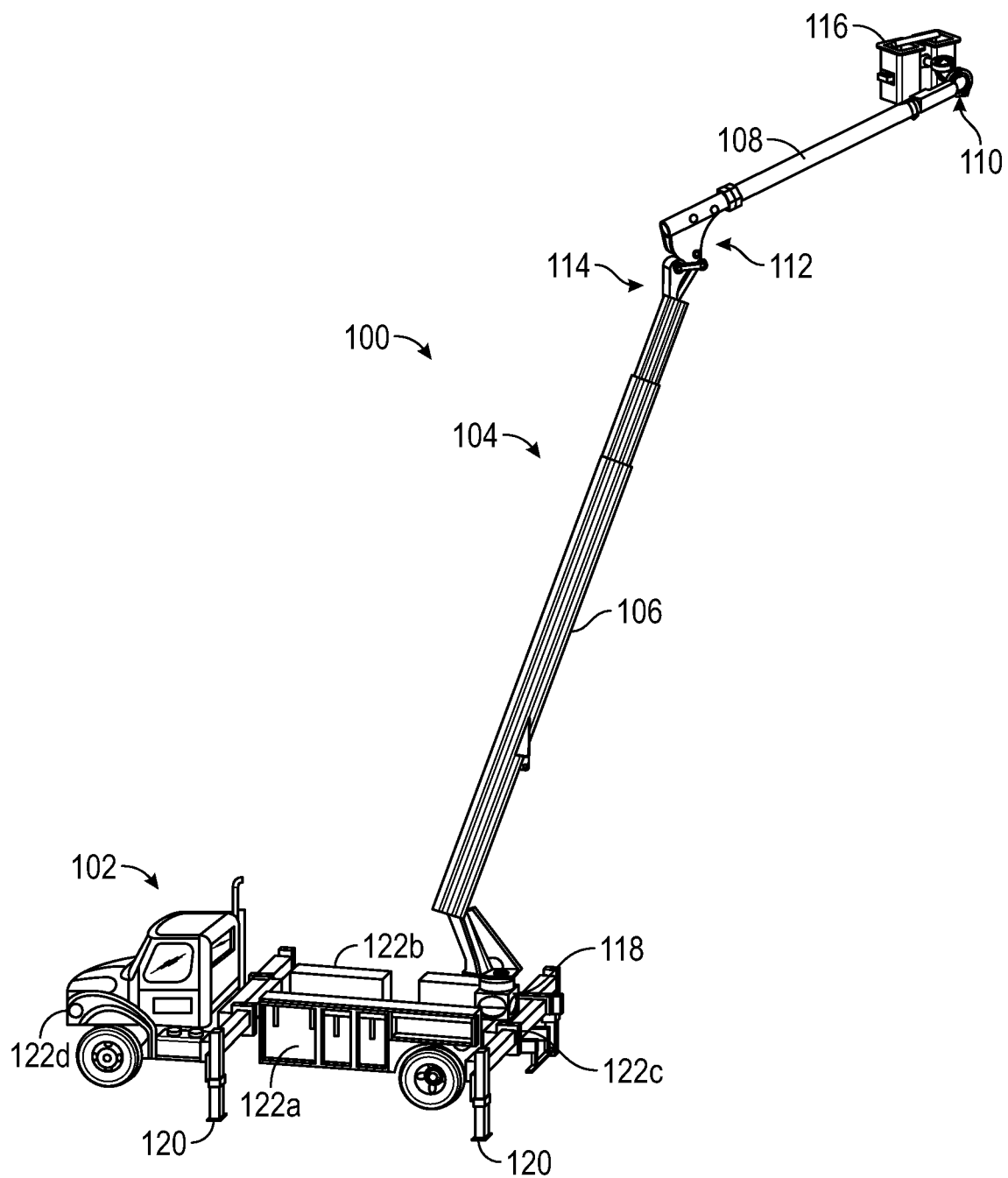
FIG. 1B illustrates aerial device in a working position for some embodiments.

FIG. 1A illustrates an aerial device 100 in a stowed position in accordance with embodiments of the present disclosure. FIG. 1B illustrates aerial device 100 in a non-stowed or working position for some embodiments of the present disclosure. Aerial device 100 may be attached to a utility vehicle 102, as shown. In some embodiments, aerial device 100 comprises a boom assembly 104. The boom assembly 104 may comprise a proximal or lower boom section 106, a distal or upper boom section 108 (also referred to as a flyboom), and a boom tip 110. In some embodiments, boom assembly 104 is an underfold boom assembly in which upper boom section 108 folds beneath lower boom section 106 when boom assembly 104 is in the stowed position. In some embodiments, either or both of lower boom section 106 and upper boom section 108 may include a telescoping portion for telescopically extending and retracting the length of boom assembly 104. In some embodiments, lower boom section 106 is a four-stage telescoping boom. Generally, lower boom section 106 may comprise any number of stages. In some embodiments, aerial device 100 is an articulating boom.

Lower boom section 106 and upper boom section 108 may be connected via a connecting assembly 112 configured to manage the load transition between the distinct materials forming lower boom section 106 and upper boom section 108, as discussed further hereinafter. Aerial device 100 may further comprise a 4-bar mechanism 114 for articulating upper boom section 108. In some embodiments, the 4-bar mechanism 114 enables upper boom section 108 to rotate at least 180 degrees relative to the stowed position.

Boom tip 110 may be coupled to a utility platform 116, which may have a jib thereon (not shown). Utility platform 116 may be a bucket, for example, in which a lineman may be positioned to operate on an energized line. Boom tip 110 may be coupled to upper boom section 108 via a pinned connection, as discussed further below with respect to FIGS. 4A-4F. In some embodiments, boom tip 110 is coupled to a slew driver level configured to maintain utility platform 116 at a level working position. An exemplary slew drive leveler is discussed in commonly-owned U.S. application Ser. No. 18/380,510, titled "SLEW DRIVE SYSTEM FOR AERIAL PLATFORM LEVELING" the entirety of which is incorporated by reference herein. In some embodiments, boom tip 110 supports a robotic assembly that may be remotely controlled by an operator working remotely from the energized powerline.

Aerial device 100 may further comprise a turntable 118 located on utility vehicle 102. Turntable 118 may be coupled to a proximal end of lower boom section 106 and may pivotally move boom assembly 104. Turntable 118 may rotate between 0 and 360 degrees to cause corresponding rotation of boom assembly 104. Utility vehicle 102 may comprise one or more outriggers 120 for stabilizing utility vehicle 102.

Aerial device 100 may be used for performing work on or near high-voltage power lines. As such, aerial device 100 may be operated near electrically powered high-voltage cables. In some embodiments, utility platform 116 and boom assembly 104 comprise insulating material for electrically insulating aerial device 100. Further, any electrical components disposed in the utility platform 116 and/or boom assembly 104 may be self-contained and separate from the electrical components of utility vehicle 102. Accordingly, a dielectric gap is created between components at the distal end of upper boom section 108 (i.e., boom tip 110 and utility platform 116) and utility vehicle 102. In some embodiments, lower boom section 106 is non-insulating and may be formed from steel, for example, and upper boom section 108 is insulating and may be formed from fiberglass, for example. In some embodiments, utility vehicle 102 may generally be referred to as a base, and may be any of a vehicle, a crane, a platform, a truck bed, a mechanical tree trimming apparatus, or any other base capable of supporting aerial device 100.

Aerial device 100 may have a maximum working height of about 105 feet. Boom tip 110 may be configured to support a weight of about 1500 pounds. Aerial device 100 may have a side reach off of the sides 122a, 122b and rear 122c of utility vehicle 102 of about 56 feet. Aerial device 100 may have a side reach off the front 122d of utility vehicle 102 of about 47 feet. It will be appreciated that the dimensions provided above are exemplary, and that other dimensions may be employed without departing from the scope of the present disclosure.

Composite-Steel Interface

Figures 2A, 2B:
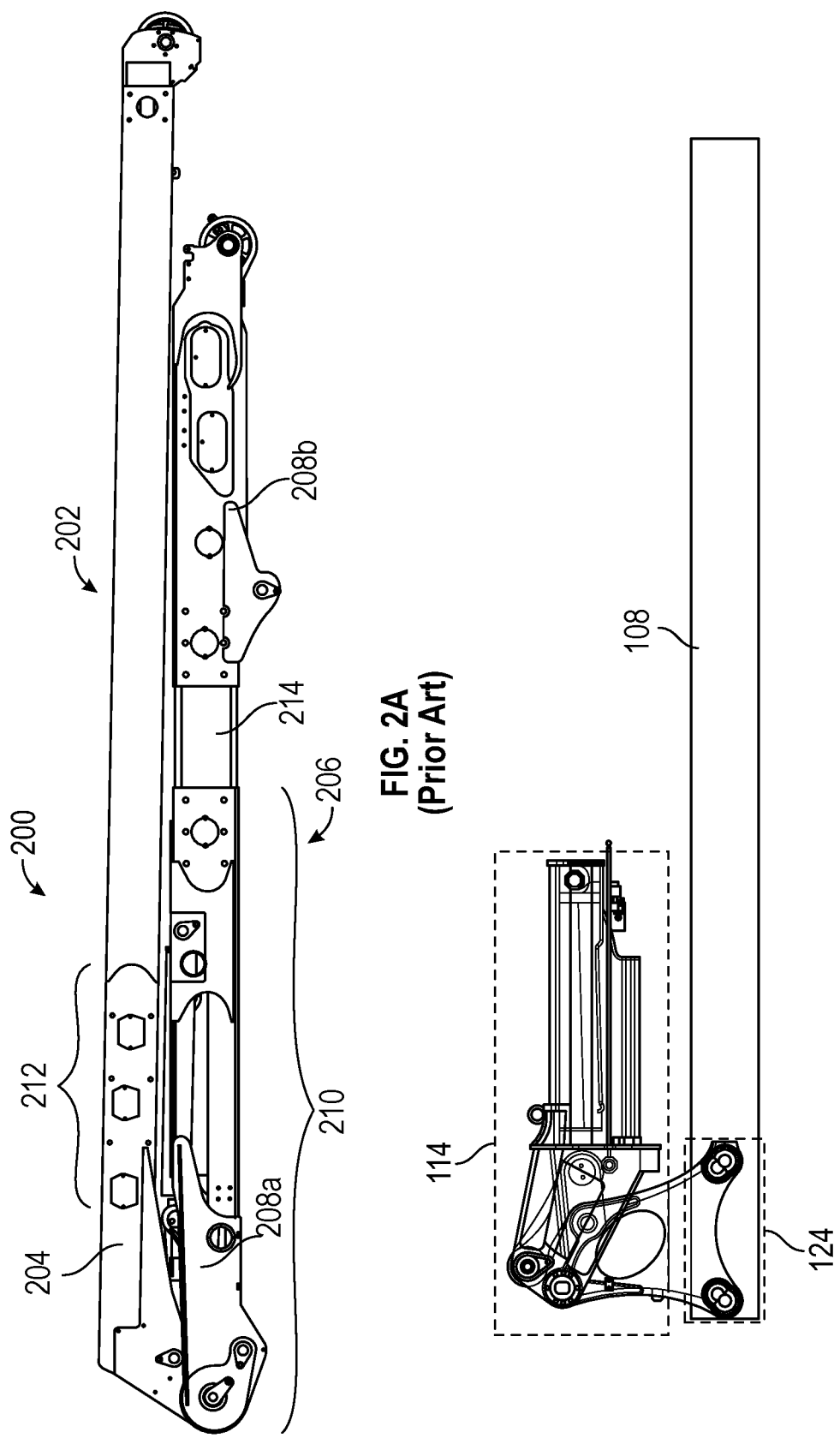
FIG. 2A illustrates a prior art boom assembly.
FIG. 2B illustrates boom assembly comprising a connecting assembly for some embodiments.

FIG. 2A illustrates a prior art boom assembly 200 comprising an upper boom 202 having an upper boom non-insulating structure 204 and a lower boom 206 comprising an upper non-insulating section 208a and a 4-bar mechanism 210 having a steel-glass interface 212. The lower boom 206 may further comprise an insulating section 214 and a lower non-insulating section 208b, that may also be joined by a steel-glass interface. Upper boom 202 and lower boom 206 are joined at interface 212. Typically, upper boom 202 and lower boom 206 are connected by drilling match holes and inserting fasteners therethrough, along with filling the interior of interface 212 with an adhesive, such as glue. Such an interface 212 suffers from various deficiencies. By adhering upper boom 202 to lower boom 206 using an adhesive, boom assembly 200 becomes a permanently fixed structure. Accordingly, if either upper boom 202 or lower boom 206 are damaged, the entire boom assembly 200 must be replaced even if the damage is only to a single boom section. Additionally, the gluing process is messy, time consuming, and otherwise undesirable from a manufacturing standpoint as compared to a traditional joining process (e.g., using removable fasteners). Furthermore, the adhesives used can be expensive and add additional weight to the boom assembly 200. The boom assembly 200 may have a longer overall length and a larger 4-bar mechanism 210 due to the increased weight. It is desirable to reduce the length of the interface 212 to reduce the weight of boom assembly 200. Other deficiencies with boom assembly 200 will be readily apparent to one of skill in the art.

FIG. 2B illustrates boom assembly 104 comprising connecting assembly 112 in accordance with embodiments of the present disclosure. In contrast to boom assembly 200, connecting assembly 112 does not comprise adhesives. Instead, the connection between connecting assembly 112 and upper boom section 108 is a pinned connection as discussed in further detail below. The pinned connecting assembly 112 may enable both a shorter steel-composite interface 124 and an overall boom length as compared to prior art boom assembly 200 without reducing the load that can be supported by upper boom section 108 and boom tip 110. Shortening the length of steel-composite interface 124 may lead to weight reduction of boom assembly 104. Further still, the pinned connecting assembly 112 may eliminate the need for adhesives, which further reduces the weight of aerial device 100, reduces assembly times, and allows for connecting assembly 112 and 4-bar mechanism 114 on boom assembly 104 and upper boom section 108 to be separately serviced in the event of damage to upper boom section 108. In contrast, the permanent coupling of upper boom non-insulating structure 204 to upper boom 202 prevents separately servicing upper boom non-insulating structure 204 and upper boom 202 in the event of damage to upper boom 202. The use of a pinned interface 124 may also enable a more compact 4-bar mechanism 114 because the 4-bar mechanism 114 does not experience as large of a moment load due to the shortened length of the upper boom section 108. The 4-bar mechanism 114 is discussed in further detail below with respect to FIGS. 5A-5C.

Figure 3A:
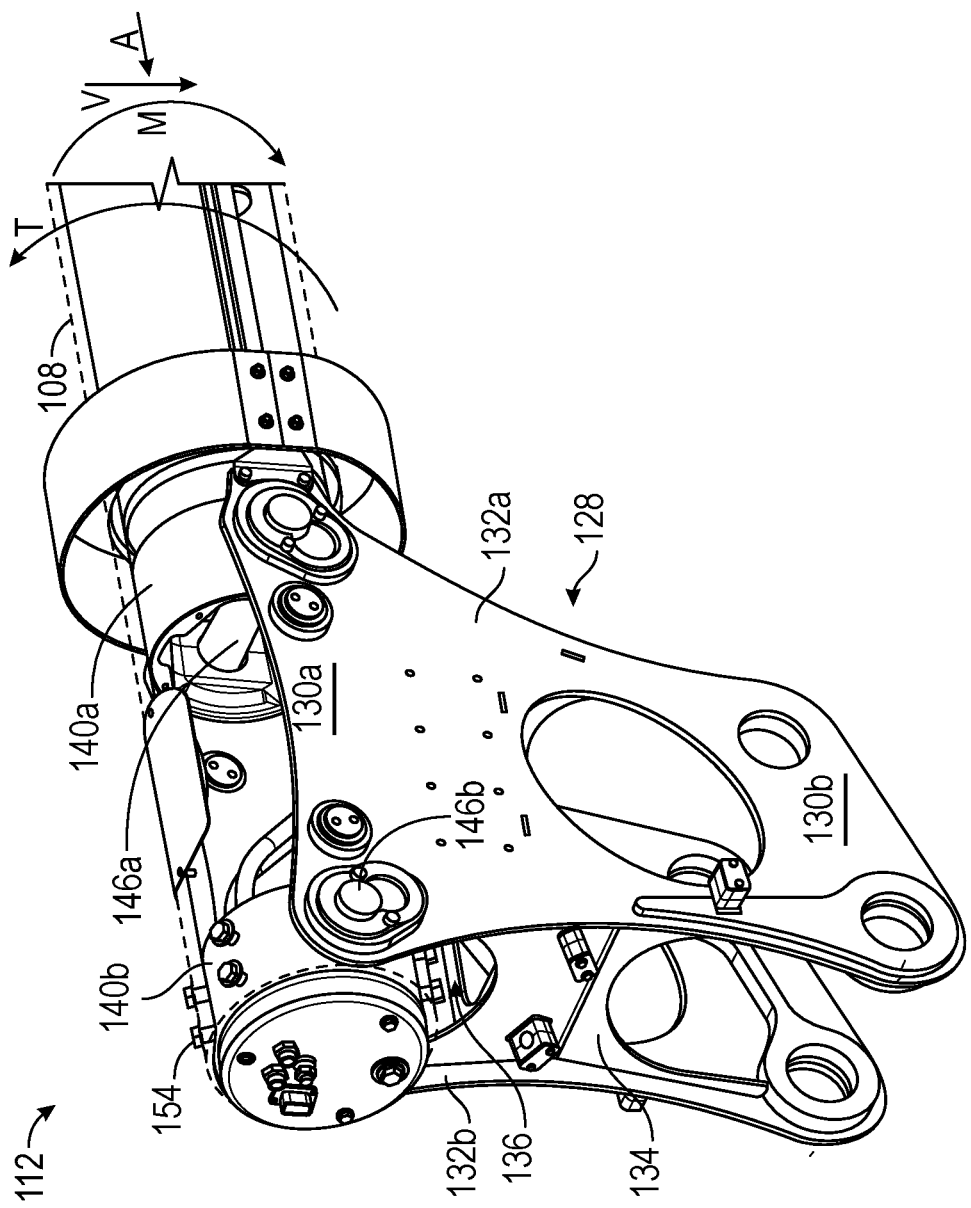
FIG. 3A illustrates a perspective view of the connecting assembly for some embodiments.

FIG. 3A illustrates a perspective view of the connecting assembly 112 in accordance with embodiments of the present disclosure. In some embodiments, connecting assembly 112 comprises a pistol or structural frame 128. The structural frame 128 may comprise an upper end 130a and a lower end 130b. Upper end 130a may be coupled to upper boom section 108, and lower end 130b may be coupled to lower boom section 106. Structural frame 128 may further comprise a first plate 132a opposite a second plate 132b. Plates 132a, 132b may be substantially similar. At least one connecting member 134 may extend laterally to connect first plate 132a to second plate 132b. In some embodiments, structural frame 128 comprises a front connecting member 134 and a rear connecting member 134 (see also FIG. 3F). In some embodiments, structural frame 128 is an integral structure, and connecting members 134 may be welded to plates 132a, 132b. In some embodiments, structural frame 128 comprises steel, titanium, or the like.

First plate 132a and second plate 132b may be separated by an opening 136 at upper end 130a through which a proximal end of upper boom section 108 may be received therein such that the upper end 130a of plates 132a, 132b are on opposing sides of upper boom section 108 as shown. Each plate 132a, 132b may comprise bores 138 (see FIG. 3F) configured to absorb forces from upper boom section 108, as discussed in further detail below.

Figure 3B:
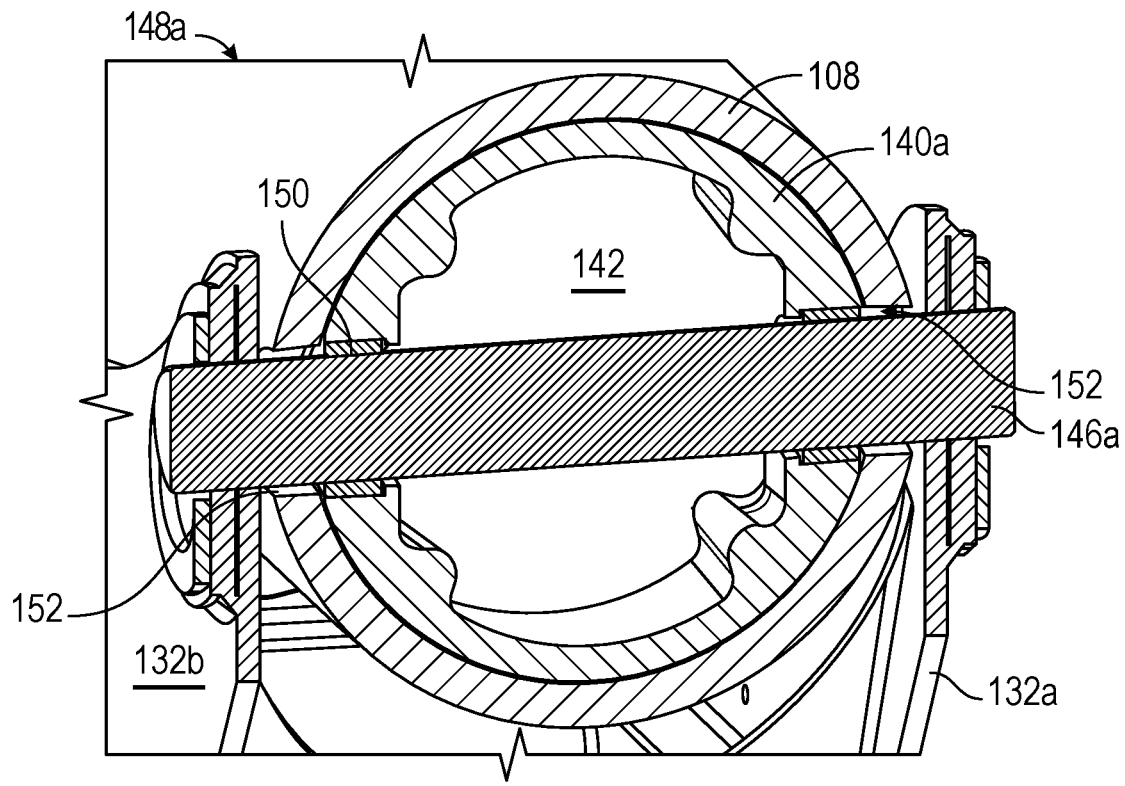
FIG. 3B illustrates a cross-sectional view of a front pin interface of the connecting assembly for some embodiments.
Figure 3C:
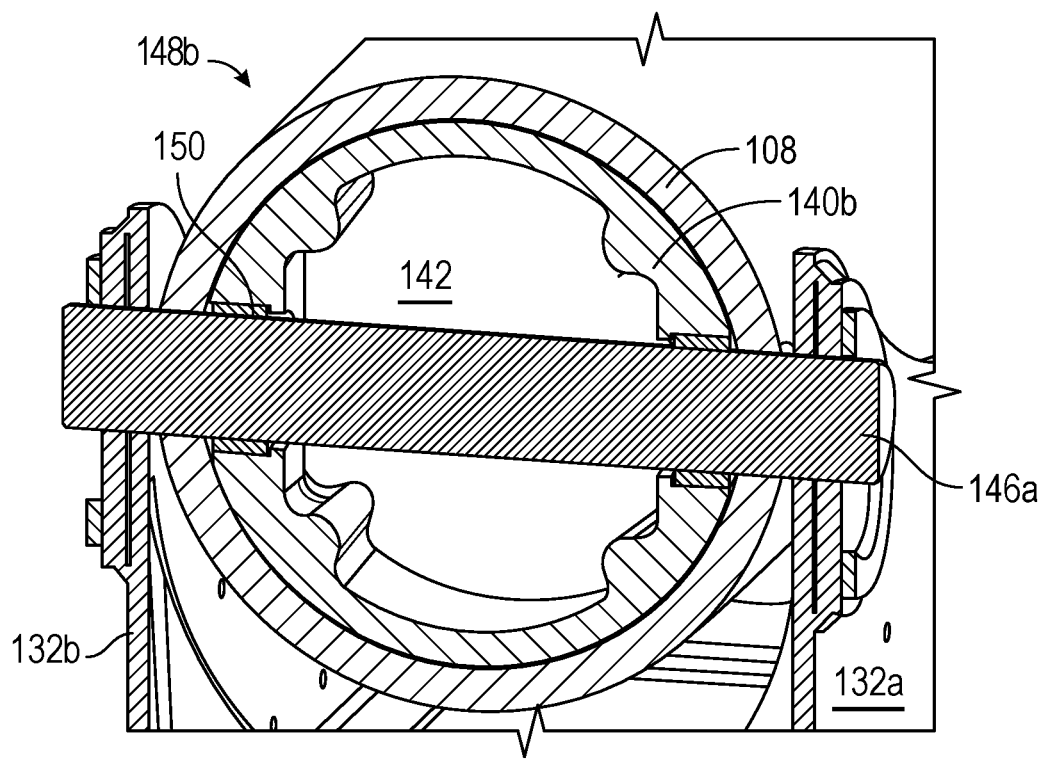
FIG. 3C illustrates a cross-sectional view of a rear pin interface of the connecting assembly for some embodiments.
Figure 3D:
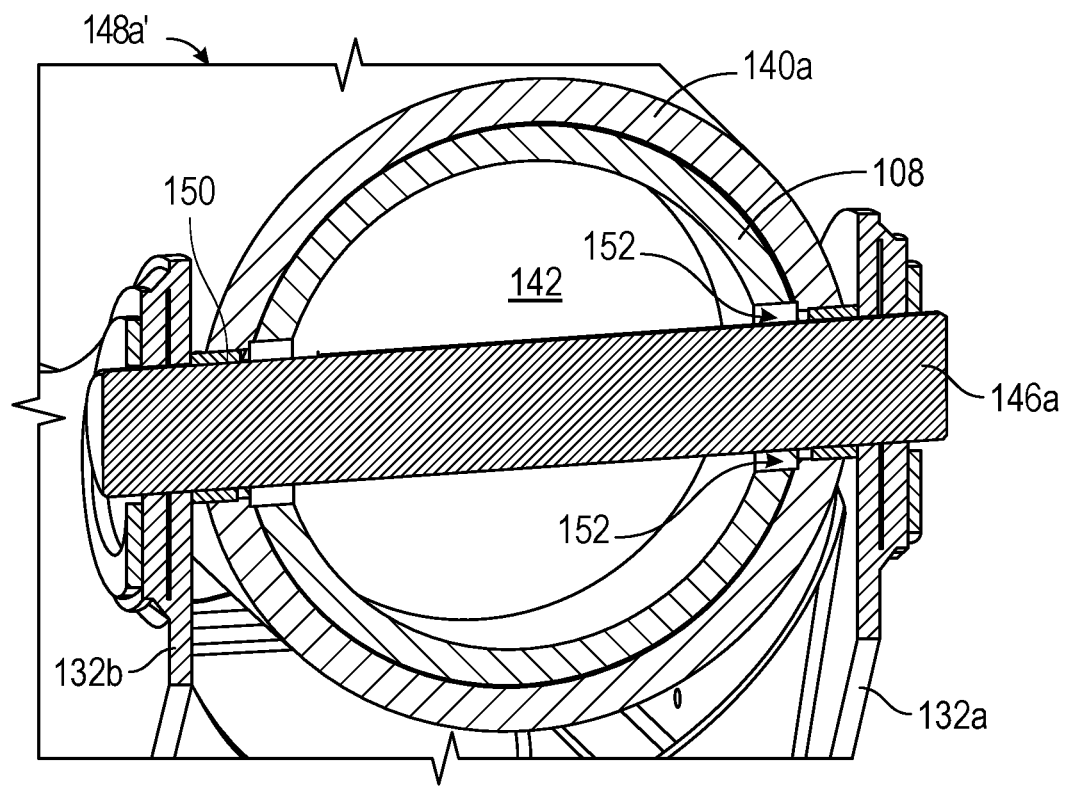
FIG. 3D illustrates an alternative embodiment of the front pin interface for some embodiments.
Figure 3E:
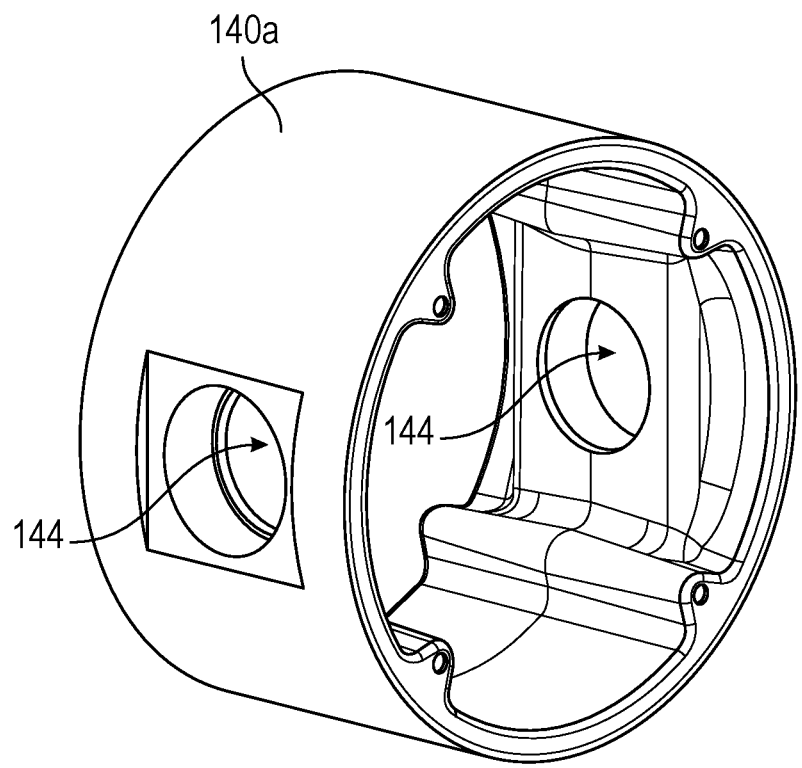
FIG. 3E illustrates a structural collar of the connecting assembly for some embodiments.
Figure 3F:
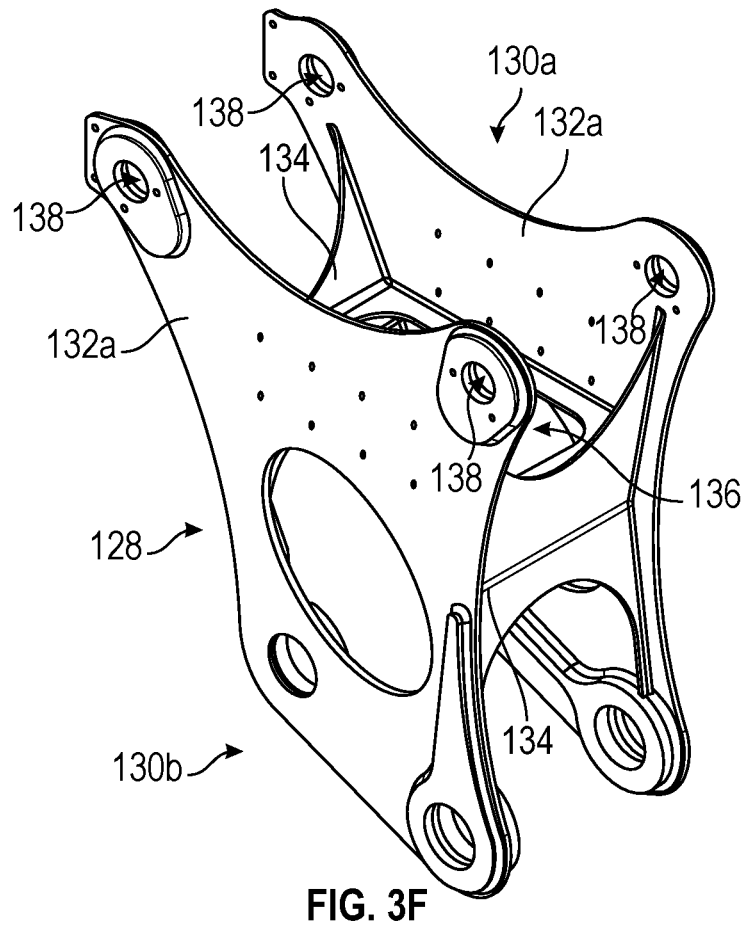
FIG. 3F illustrates a structural member of the connecting assembly for some embodiments.

Connecting assembly 112 may also comprise a front insert or collar 140a and a rear insert or collar 140b coupled to upper boom section 108. In some embodiments, collars 140a, 140b are received within a bore 142 of upper boom section 108, as shown in FIGS. 3B-3C. In some embodiments, collars 140a, 140b are coupled to an exterior of upper boom section 108, as shown in FIG. 3D. Front collar 140a and rear collar 140b may be substantially similar in some embodiments. Collars 140a, 140b may have a cross-section that matches the cross-section of upper boom section 108. In some embodiments, the outer profile of collars 140a, 140b matches an inner profile of upper boom section 108. In some embodiments, the inner profile of collars 140a, 140b matches the outer profile of upper boom section 108. For example, and as shown in FIGS. 3A-3C, when upper boom section 108 presents a circular cross-section, collars 140a, 140b may also comprise a circular cross-section. Generally, upper boom section 108 and collars 140a, 140b may take any geometrical cross-section, such as rectangular or pentagonal. The use of collars having non-circular cross-sections may be advantageous because such collars are able to resist torsional loads applied to upper boom section 108. In some embodiments, collars 140a, 140b comprise aluminum, steel, or the like.

Collars 140*a*, 140*b* may form a close fit with a surface of upper boom section 108. When collars 140*a*, 140*b* are received within upper boom section 108, collars 140*a*, 140*b* may form a close fit with an interior surface of upper boom section 108. When collars 140*a*, 140*b* are on an exterior of upper boom section 108, an interior surface of collars 140*a*, 140*b* may form a close fit with an exterior surface of upper boom section 108, as shown in FIG. 3D. In some embodiments, the close fit is such that collars 140*a*, 140*b* are in contact with upper boom section 108. In some embodiments, the close fit is such that a gap is present between collars 140*a*, 140*b* and upper boom section 108 when no load or a load below a certain magnitude is applied to 108, and when a load of sufficient magnitude is applied to upper boom section 108, upper boom section 108 deforms to contact collars 140*a*, 140*b* and the load is transferred from upper boom section 108 to collars 140*a*, 140*b*. In some embodiments, the close fit enables the collars 140*a*, 140*b* to be slid into upper boom section 108 without requiring a press fit (e.g., using only a nominal force). In some embodiments, the close fit conforms to the RC7 (free running fit), or RC8 or RC9 (loose running fits) standard for running and sliding limits for cylindrical parts. In some embodiments, the close fit comprises a clearance of about 0.012" to about 0.036" on the diameter; however, it will be appreciated that other dimensions may be used. By forming a close fit with upper boom section 108, collars 140*a*, 140*b* may absorb and transfer loads from upper boom section 108 to other components in connecting assembly 112.

Reference is now made to FIGS. 3B, 3C, and 3E-3F, where it can be seen that each collar 140*a*, 140*b* may comprise opposing holes 144 for receiving a front pin 146*a* and a rear pin 146*b*, respectively there through. Each pin 146*a*, 146*b* may extend through a bore 138 in first plate 132*a*, into a first side of upper boom section 108, through a collar 140*a*, 140*b*, out of a second side of upper boom section 108, and through a corresponding bore 138 second plate 132*b*. Accordingly, the moment (M) and shear (V) loads that are applied to upper boom section 108 may be transferred from upper boom section 108 and then to collars 140*a*, 140*b*. Loads from collars 140*a*, 140*b* may then be transferred to pins 146*a*, 146*b* (through one or more bearings 150), and from pins 146*a*, 146*b* to structural frame 128. The bores 138 in structural frame 128 may then absorb the loads transferred from pins 146*a*, 146*b*. In some embodiments, collars 140*a*, 140*b* are able to pivot on pins 146*a*, 146*b*. Accordingly, when a load is applied to collars 140*a*, 140*b* from upper boom section 108, the pivoting action allows collars 140*a*, 140*b* to maintain contact with the surface of upper boom section 108 even as upper boom section 108 may deflect under the load, thereby preventing edge loading on the edges of collars 140*a*, 140*b*. This pivoting action may also minimize contact stress between upper boom section 108 and collars 140*a*, 140*b*. While two collars 140*a*, 140*b* and pins 146*a*, 146*b* are illustrated, it is contemplated that fewer or more than two collar/pin couplings may be present in connecting assembly 112. For example, a third, middle collar and corresponding pin may be located between the front collar 140*a* and front pin 146*a* and the rear collar 140*b* and rear pin 146*b*.

FIG. 3B depicts a cross-sectional view of a front pin interface 148*a* comprising front collar 140*a*, front pin 146*a*, upper boom section 108, and structural frame 128. Front pin interface 148*a* may further comprise one or more bearings 150 to transfer the load from collars 140*a*, 140*b* to pins 146*a*, 146*b*. In some embodiments, the one or more bearings 150 are fiberglass bearings. Other materials are within the scope hereof. Generally, any material and/or component that transfers load from collars 140*a*, 140*b* to pins 146*a*, 146*b* while allowing for rotation about the pin 146*a*, 146*b* is within the scope hereof. For example, bearings with rolling elements (e.g., ball or needle) may be used. Further, FIG. 3B illustrates that a gap 152 may be present between upper boom section 108 and front pin 146*a*. The presence of gap 152 may prevent direct contact between upper boom section 108 and front pin 146*a*. Preventing contact between upper boom section 108 and front pin 146*a* may eliminate point loading of front pin 146*a*, forcing the load to be transferred from upper boom section 108 to front collar 140*a*, from front collar 140*a* to one or more bearings 150, and from one or more bearings 150 then to front pin 146*a* as previously discussed. Cross holes in upper boom section 108 through which pins 146*a*, 146*b* are inserted may be larger than the pins 146*a*, 146*b* such that gap 152 is created to prevent contact between upper boom section 108 and pins 146*a*, 146*b*. Thus, all loads are transferred from upper boom section 108 to collars 140*a*, 140*b* before passing to pins 146*a*, 146*b*.

FIG. 3C illustrates a rear pin interface 148*b* comprising rear collar 140*b*, rear pin 146*b*, upper boom section 108, and structural frame 128 for some embodiments. Rear pin interface 148*b* may also comprise bearings 150 for transferring the load from rear collar 140*b* to rear pin 146*b*. In contrast to the front pin interface 148*a*, in some embodiments, a close fit between upper boom section 108 and rear pin 146*b* may be present. Providing a close fit at the rear pin interface 148*b* may be advantageous as the close fit between upper boom section 108 and rear pin 146*b* may allow for rear pin 146*b* to resist torsional (T) loads applied to upper boom section 108. Because the rear pin interface 148*b* may experience moment and/or shear loads of lower magnitude than the front pin interface, the concerns of overloading rear pin 146*b* from point loading may be less in contrast to the front pin interface 148*a* where the point loading may cause a failure in connecting assembly 112. Accordingly, a close fit may be used to resist the torsional loads.

In some embodiments, there is no close fit between upper boom section 108 and rear pin 146*b*, and a gap 152 may be present as discussed above with respect to the front pin interface. Accordingly, direct contact between upper boom section 108 and rear pin 146*b* is avoided. In some such embodiments, to handle torsional loads, one or more fasteners 154 (see FIG. 3A) may be inserted through upper boom section 108 and at least partially into rear collar 140*b*. In some embodiments, the fasteners 154 are inserted in a radial pattern. In some embodiments, a first set of fasteners 154 is inserted in an upper region of the rear pin interface, and a second set of fasteners 154 is inserted in a lower region of the rear pin interface. In some embodiments, each set of fasteners 154 comprises four fasteners, although generally any number of fasteners may be used without departing from the scope hereof.

Collars 140*a*, 140*b* of non-circular cross sections are able to resist torsional loads. Accordingly, for non-circular collars 140*a*, 140*b*, both front collar 140*a* and rear collar 140*b* may have a gap 152 present to prevent edge loading, which could lead to failure. Thus, for non-circular cross-sections, the load path for torsional loads may be the same as for moment and shear loads as discussed above. That is, torsional loads may be transferred from upper boom section 108 to collars 140*a*, 140*b*, from collars 140*a*, 140*b* to pins 146*a*, 146*b* (through one or more bearings 150), and from pins 146*a*, 146*b* to structural frame 128.

Axial loads (A) may also act on upper boom section 108. Such axial loads are generally only due to gravity and may comprise the combined weight of upper boom section 108, boom tip 110, utility platform 116, and anything held in utility platform 116 (e.g., linemen, equipment, etc.). Circular collars 140a, 140b are unable to resist the axial load. The use of one or more fasteners 154 and/or providing a close fit between upper boom section 108 and rear pin 146b may be employed to handle the axial load. Non-circular collars 140a, 140b may resist the axial load as with the torsional load as previously discussed such that a gap 152 may be presented between both pins 146a, 146b and upper boom section 108.

FIG. 3D illustrates an embodiment of front pin interface 148a' where front collar 140a is disposed on an outer surface of upper boom section 108. Rear pin interface 148b may be substantially similar to front pin interface 148a' when rear collar 140b is external to upper boom section 108. When front collar 140a is on the outer surface of upper boom section 108, front pin 146a may extend through first plate 132a, through a first side of collar 140a, through upper boom section 108, through a second side of front collar 140b, and then through second plate 132b. When collars 140a, 140b are external to upper boom section 108, the load path may be the same as when collars 140a, 140b are within upper boom section 108 (i.e., from upper boom section 108 to collars 140a, 140b, from collars 140a, 140b to pins 146a, 146b, and from pins 146a, 146b to structural frame 128). In some embodiments, one collar 140a, 140b may be on an exterior surface of upper boom section 108, and the other collar 140a, 140b may be within bore 142 of upper boom section 108.

Pinned Connection at Boom Tip

Figure 4A:
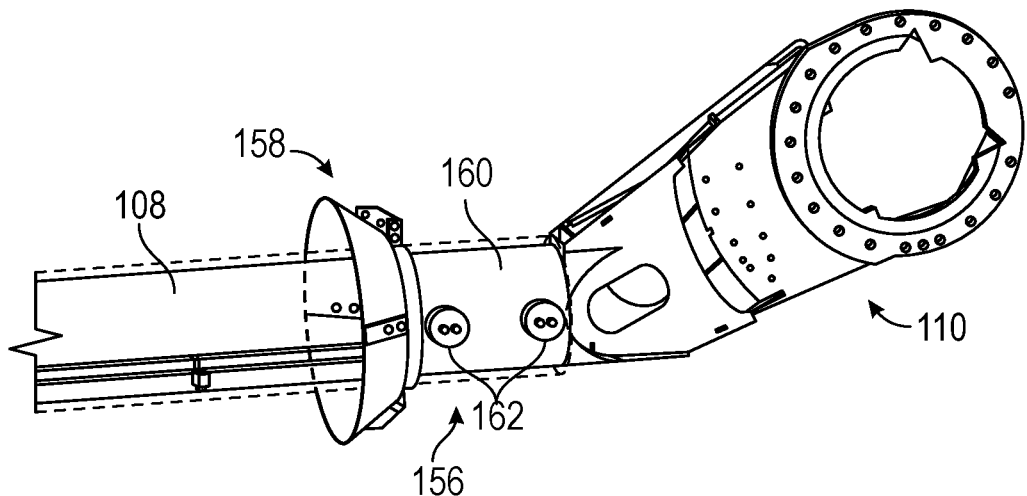
FIG. 4A illustrates a first connection for a composite-steel interface at a boom tip for some embodiments.
Figure 4B:
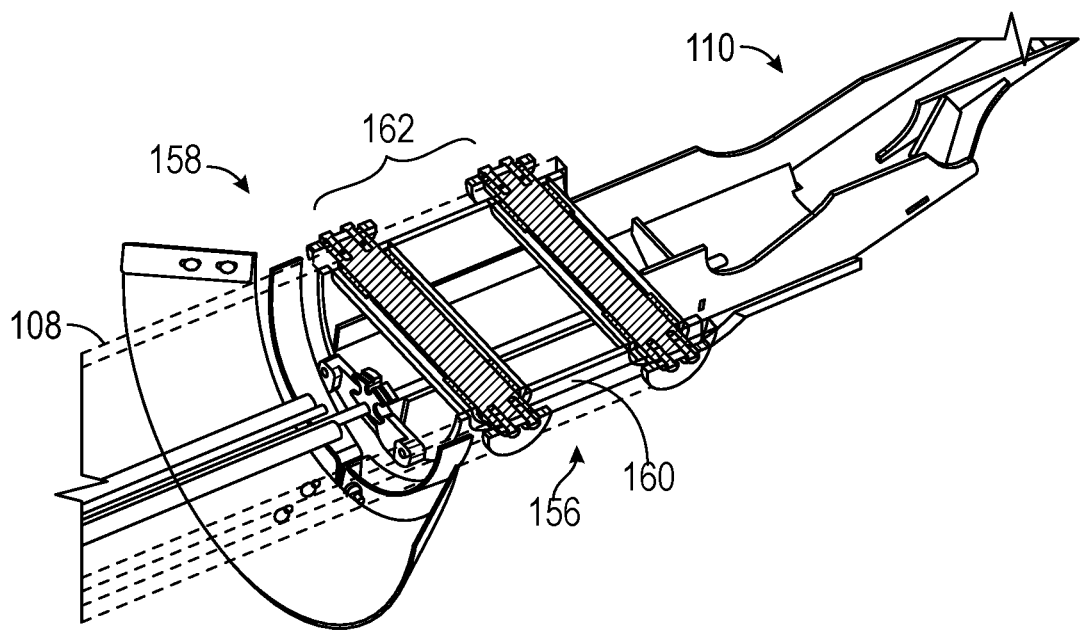
FIG. 4B illustrates a cross-sectional view of the first connection for the composite-steel interface at the boom tip for some embodiments.

FIGS. 4A and 4B illustrate a perspective view and a cross-sectional view of a second steel-composite interface 156 for some embodiments of the present disclosure. In some embodiments, second composite-steel interface 156 may be located near boom tip 110, connecting the fiberglass of a distal end 158 of upper boom section 108 to the steel boom tip 110. As shown, boom tip 110 may have a cylindrical portion 160 extending within distal end 158, with this region being the second steel-composite interface 156.

Similar to connecting assembly 112 discussed above, fasteners 162 may be inserted through upper boom section 108 and cylindrical portion 160. In some embodiments, fasteners 162 are substantially similar to pins 146a, 146b discussed above. Fasteners 162 may help manage loads applied to distal end 158. In contrast to steel-composite interface 124, second steel-composite interface 156 may not have any collars because the applied loads may be lower in magnitude such that the use of collars to spread the load over a larger surface area is not needed. To state another way, the loads applied to upper boom section 108 may be of a magnitude that can be resisted by fasteners 162 themselves. Accordingly, the distal end 158 may be in direct contact with fasteners 162. It is contemplated that one or more collars 140a, 140b may be used with second steel-composite interface 156 without departing from the scope hereof. The collars 140a, 140b may be internal or external to upper boom section 108. As shown, two fasteners 162 are present in second steel-composite interface 156. More or fewer fasteners 162 may be used. The number and/or dimensions of fasteners 162 may be selected based on the specific use case (e.g., the loads expected to be experienced at distal end 158 by boom tip 110).

Figure 4D:
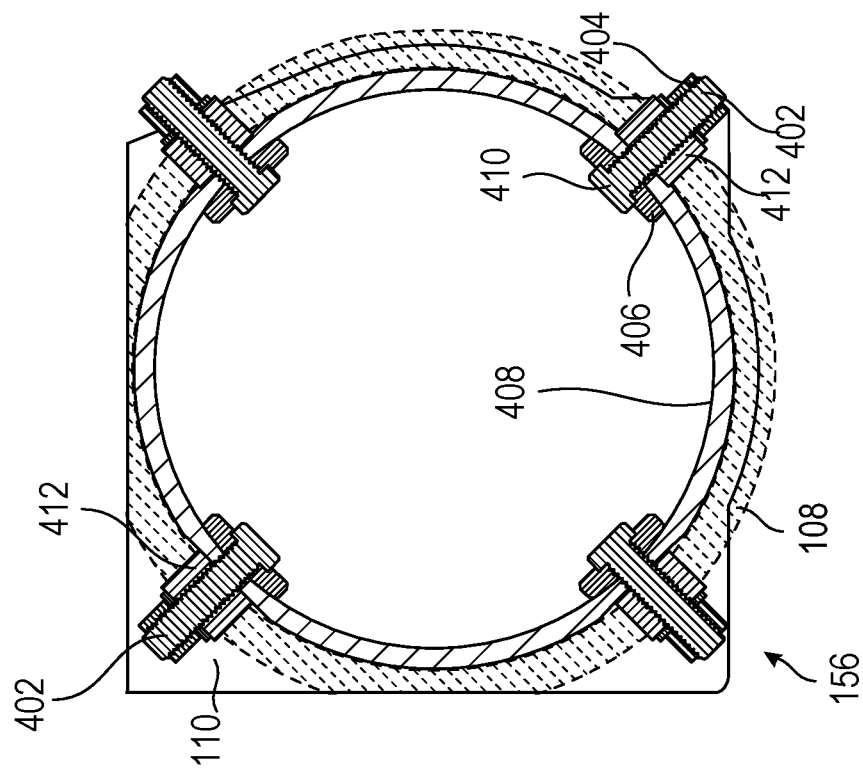
FIG. 4D illustrates a cross-sectional view of the second connection for the composite-steel interface at the boom tip for some embodiments.
Figure 4C:
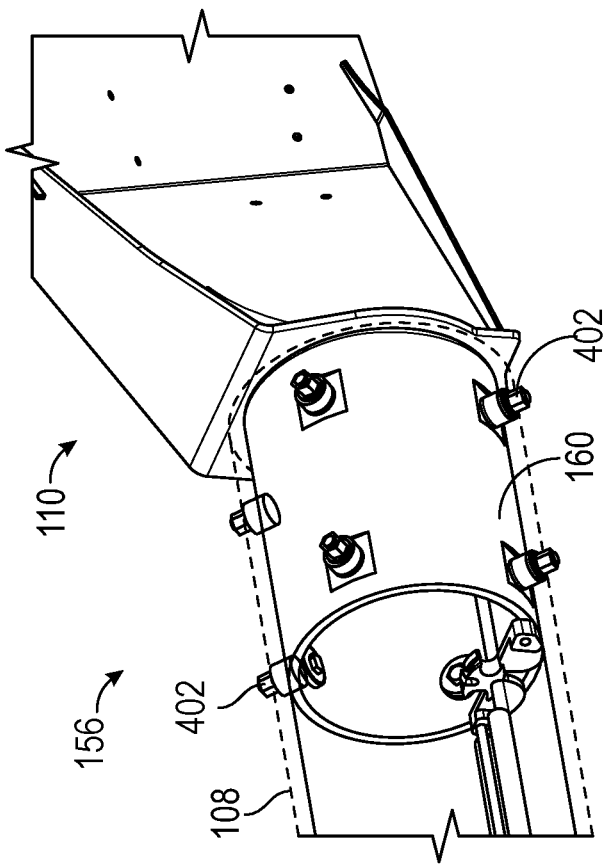
FIG. 4C illustrates a second connection for the composite-steel interface at the boom tip for some embodiments.

Turning now to FIGS. 4C and 4D, second steel-composite interface 156 is depicted illustrating a different connection than shown in FIGS. 4A and 4B. FIG. 4C illustrates a perspective view, and FIG. 4D illustrates a cross-sectional view. As shown, fasteners 402 may be inserted through upper boom section 108 and into cylindrical portion 160. Fasteners 402 may be bolts, for example. A nut 404 may secure fastener fasteners 402 to upper boom section 108, and a washer 406 may be disposed between an inner surface 408 of cylindrical portion 160 and a head 410 of the fastener 402. In some embodiments, fasteners are inserted in a radial array, similar to the arrangement of one or more fasteners 154 on rear collar 140b. In some embodiments, two arrays of fasteners 402 are provided as shown. Each array of fasteners 402 may comprise four fasteners 402, with two fasteners 402 inserted through an upper region of upper boom section 108, and two fasteners 402 inserted through a lower region of upper boom section 108. Other arrangements of fasteners 402 (e.g., fewer/more fasteners 402, fewer/more arrays of fasteners 402, different locations on upper boom section 108, etc.) are within the scope hereof.

As seen best in FIG. 4D, a spacer 412 may be disposed into a bore of upper boom section 108 and may form a close fit with the upper boom section 108 to create a tight fit between the fiberglass upper boom section 108 and the steel cylindrical portion 160. The spacers 412 may aid in transferring loads from the composite upper boom section 108 and to the fasteners 402 via the steel cylindrical portion 160.

Turning now to FIGS. 4E and 4F, second steel-composite interface 156 is depicted illustrating a third connection in accordance with embodiments of the present disclosure. FIG. 4E illustrates a perspective view, and FIG. 4F illustrates a cross-sectional view. Here, a connection between upper boom section 108 and boom tip 110 may be made at cylindrical portion 160 by way of trunnions 452 to manage loads at second steel-composite interface 156. In some embodiments, four trunnions 452 are used, with two trunnions 452 spaced along the length of cylindrical portion 160 diametrically opposing two corresponding trunnions 452.

Each trunnion 452 may be secured to upper boom section 108 and cylindrical portion 160 using a bolt 454. An outer diameter of the trunnion 452 may form a close fit with the bores through upper boom section 108 that the trunnion 452 is inserted. Similar to spacer 412 discussed above, this close fit may aid in transferring the loads from upper boom section 108 through cylindrical portion 160 and into trunnion 452. In contrast the pinned connection at boom tip 110 shown in FIGS. 4A and 4B, the pinned connections shown in FIGS. 4C-4F provide fasteners that do not extend across upper boom section 108 and instead extend only partially into upper boom section 108.

Articulation

Figure 5A:
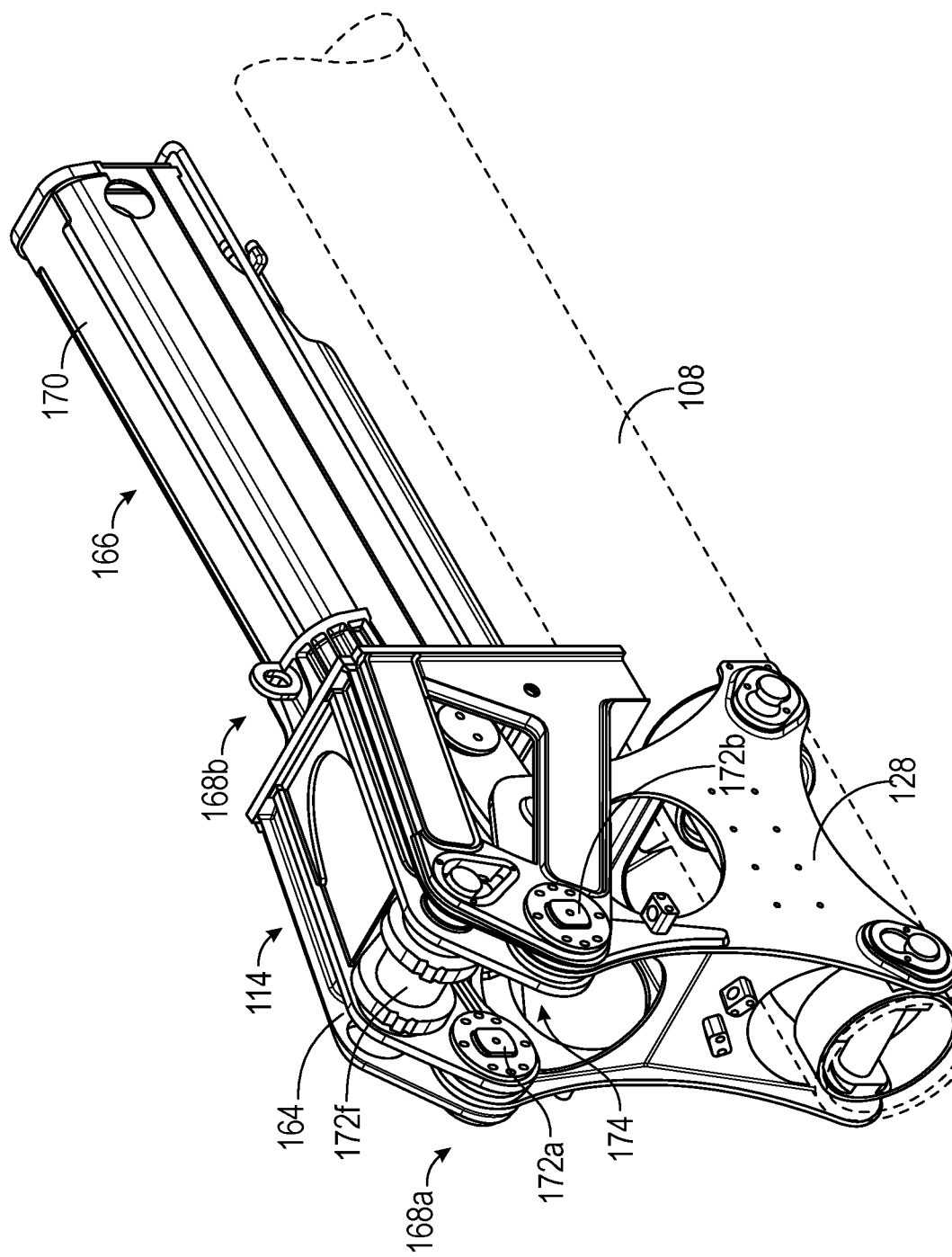
FIG. 5A illustrates a perspective view of an articulating joint of the boom assembly for some embodiments.
Figure 5B:
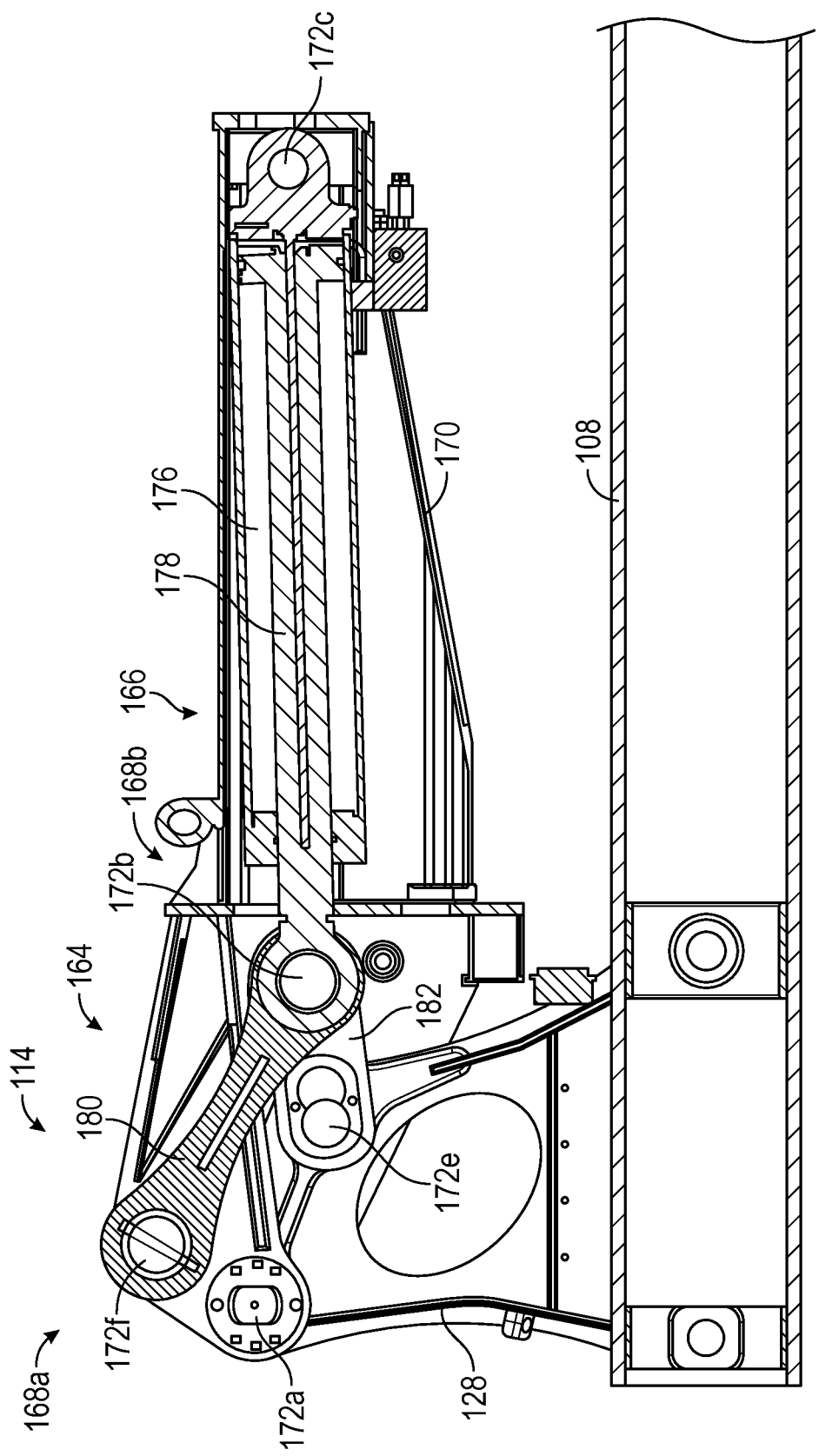
FIG. 5B illustrates a cross-sectional view of the articulating joint of in a stowed position for some embodiments.

FIGS. 5A-5C illustrate the articulation of the joint formed by lower boom section 106 and upper boom section 108 for some embodiments, e.g., when moving boom assembly 104 from a stowed position to an unstowed position for positioning a lineman to work at an energized powerline. For example, the boom assembly 104 may be moved to place utility platform 116 at or near the ground to allow the lineman to enter the utility platform 116, and then raised to the powerline for performing work thereon (e.g., to the position depicted in FIG. 1B).

As shown, at lower end 130b, structural frame 128 may be coupled to a connecting end 164 of a sled 166. Sled 166 may be a removably attachable stage of lower boom section 106 as discussed in further detail below. Connecting end 164 may have a first end 168a coupled to structural frame 128 and a second end 168b that transitions into a housing 170 for the sled 166. Lower end 130b of structural frame 128 may be coupled to first end 168a of connecting end 164 via a first split pivot pin 172a and a second split pivot pin 172b that form part of 4-bar mechanism 114. In contrast to typical articulating joints in boom assemblies that use a single pivot pin about which a pistol (e.g., structural frame 128) would rotate, the use of split pivot pins 172a, 172b, such that a gap 174 is present therebetween, allows for a greater range of motion for the articulation. Accordingly, a more compact 4-bar mechanism 114 may be realized due to the greater range of motion.

Along with split pivot pins 172a, 172b, the 4-bar mechanism 114 may comprise a base pin 172c, a first drive pin 172d, a second drive pin 172e, and an idler pin 172f. Additionally, the 4-bar mechanism 114 may comprise a drive cylinder 176 having a piston 178, an idler link 180, a pair of drive links 182, and structural frame 128. Drive cylinder 176 may be hydraulically actuated and may initiate movement of the 4-bar mechanism. Drive cylinder 176 may be housed within housing 170 and coupled to base pin 172c at a first end and to first drive pin 172d at a second end. Base pin 172c may be grounded such that base pin 172c does not move. Drive cylinder 176 may rotate about base pin 172c. First drive pin 172d may also be received by a first end of each of idler link 180 and each of the pair of drive links 182, thereby coupling drive cylinder 176, idler link 180, and drive links 182 such that translation of drive cylinder 176 causes movement (e.g., rotation) of idler link 180 and drive links 182.

Idler link 180 may also be coupled to idler pin 172f at an opposite end to an end where idler link 180 couples to first drive pin 172d. Idler link 180 may rotate about idler pin 172f when driven by drive cylinder 176. Each drive link 182 may be coupled to second drive pin 172e at an end opposite where the drive links 182 are coupled to first drive pin 172d. The second drive pin 172e may also couple drive links 182 to structural frame 128. Accordingly, as shown in FIG. 5C, drive cylinder 176 may be actuated to drive links 180, 182, and structural frame 128. At an end of a stroke of drive cylinder 176, 4-bar mechanism 114 may rotate upper boom section 108 about 180 degrees as depicted in FIG. 5C. Thus, upper boom section 108 may be unfolded from below lower boom section 106 and deployed to a working position to allow a lineman to work on an energized powerline. The use of split pins 172a, 172b allows for idler link 180 to pass through gap 174, providing a greater range of motion than if split pins 172a, 172b were a single pin extending across gap 174 and preventing further rotation of idler link 180.

Sled for Aerial Devices

Figure 6A:
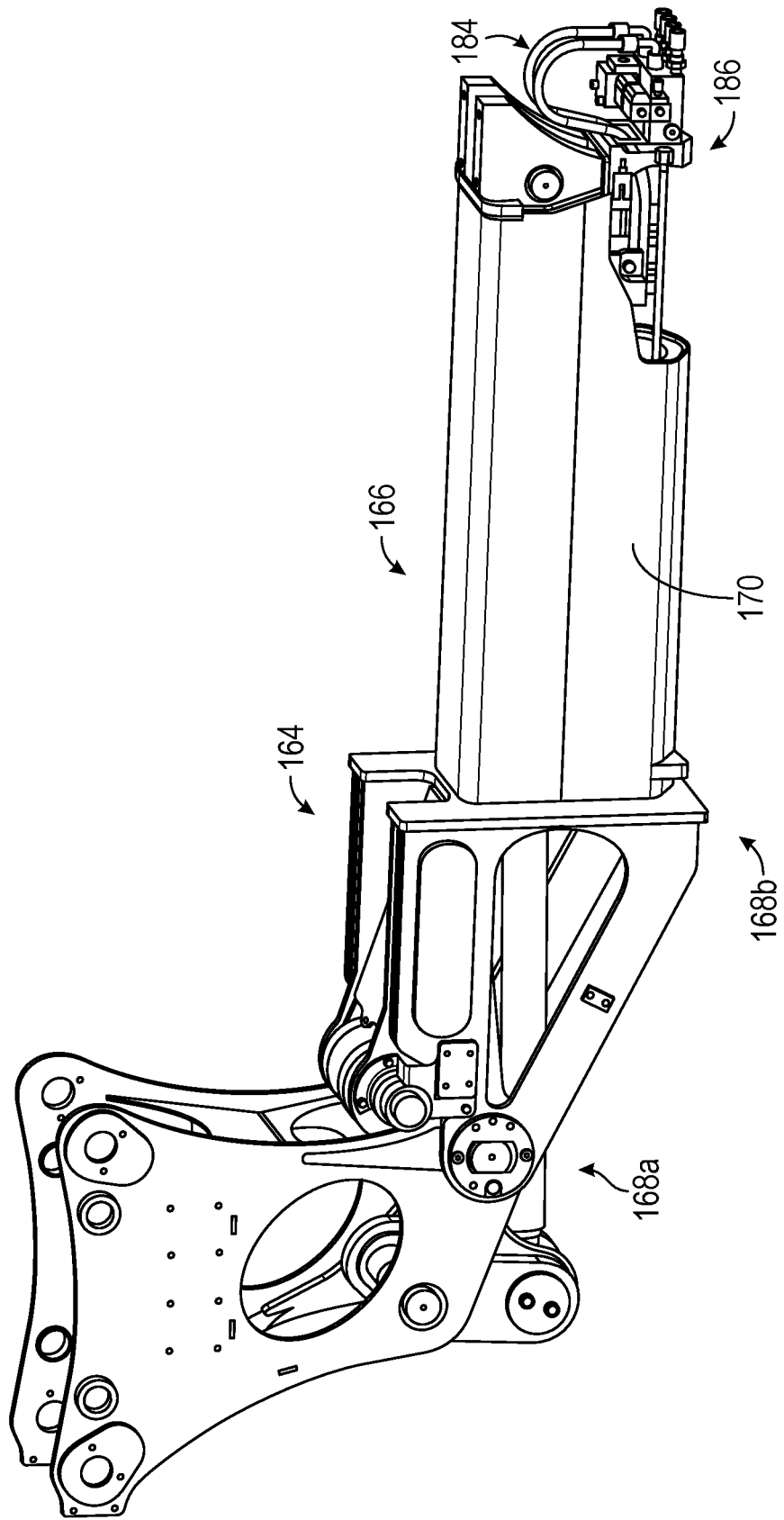
FIG. 6A illustrates a sled of a lower boom section of the boom assembly for some embodiments.
Figure 6B:
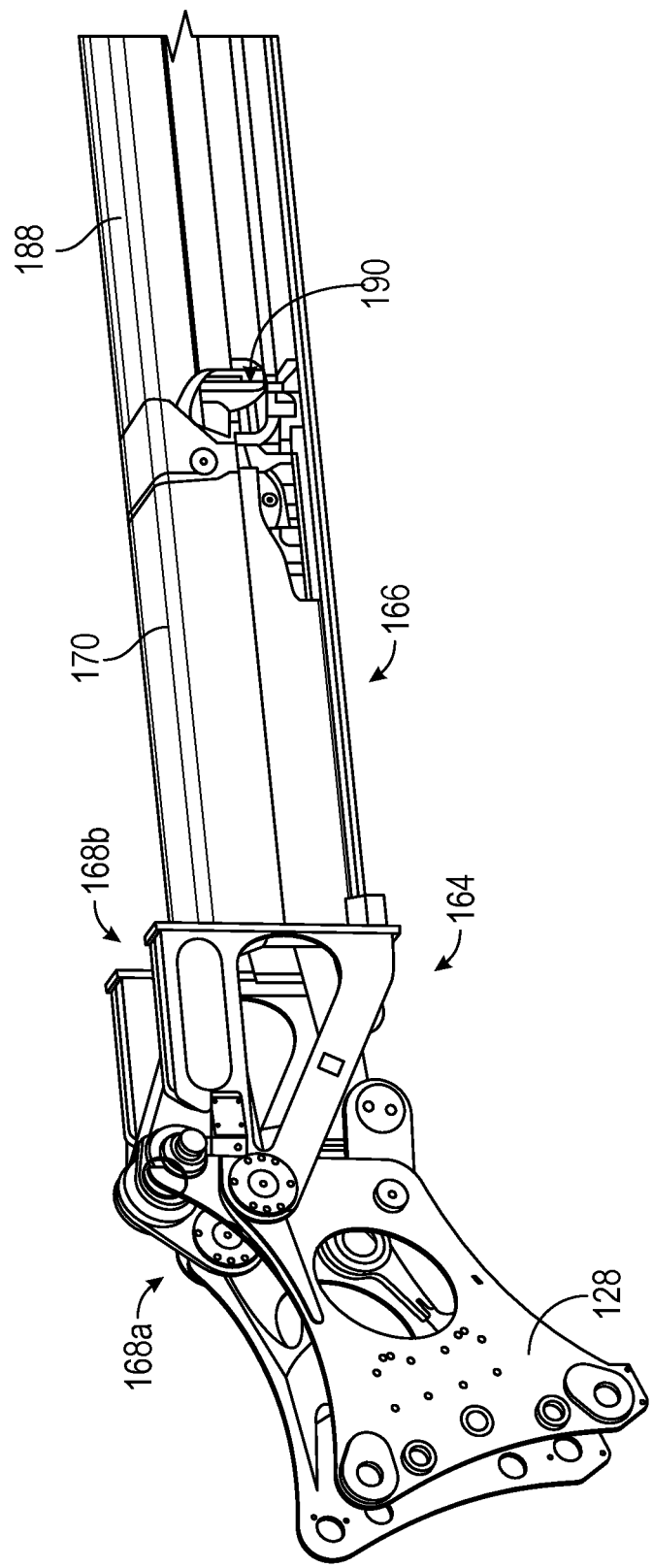
FIG. 6B illustrates the sled coupled to the lower boom section for some embodiments.

FIGS. 6A and 6B illustrate sled 166 for some embodiments. As previously discussed, boom assembly 104 may comprise a sled 166 at a distal end of lower boom section 106. Sled 166 may comprise housing 170 that houses drive cylinder 176 along with other hydraulics and sensors 184 of boom assembly 104. In some embodiments, sled 166 is a monolithic structure configured to support the weight of at least structural frame 128, drive cylinder 176, and the hydraulics and sensors 184 housed within housing 170. For example, the hydraulic valve(s) and/or sensor(s) may be disposed at a proximal end 186 of sled 166 and wired through sled 166 and to a corresponding interface at a proximal end of upper boom section 108.

In some embodiments, sled 166 provides a single structure that can easily be connected to another structure and interface therewith. Thus, it is one advantage of the present disclosure that sled 166 can be used with multiple aerial devices. For example, sled 166 may be used on both aerial device 100 and on a digger derrick device. Generally, sled 166 may be configured to attach to various aerial devices, such as on a crane, to a pole claw, or the like. Sled 166 may be invertible such that sled 166 may be used with both underfold boom assemblies and overfold boom assemblies. Additionally, sled 166 may be configured to couple to other structural members besides structural frame 128. For example, instead of structural frame 128, sled 166 may be coupled to a pole claw, for example. Because sled 166 houses the hydraulics and sensors 184 for operating at the distal end of the boom assembly, the hydraulics and sensors may be configurable and connectable to various different effectors coupled to sled 166. Where articulation is desired, structural frame 128 may be used.

As shown in FIG. 6B, sled 166 may be slidably received within a stage 188 of the telescoping lower boom section 106. For example, sled 166 may be brought to a worksite separately from the machinery that sled 166 is to be used with and, at the job site, connected to stage 188 using removable fasteners or the like. As such, in the event that sled 166 needs to be serviced, the ease of servicing is increased because sled 166 can be decoupled from a respective aerial device, serviced, and then reattached to the aerial device. This modularity of sled 166 may also allow sled 166 to be serviced onsite rather than being brought to a dedicated facility for servicing. As another example of improved serviceability, servicing boom sections often requires going through a small access hole 190 provided by stage 188 that is difficult to access and work in due to the size of small access hole 190. By providing a modular, detachable sled 166, if sled 166 needs to be serviced (e.g., if any of the sensors 184 need to be replaced), sled 166 may be decoupled from the stage 188 and then serviced without having to go through small access hole 190.

Further still, providing the modular sled 166 may improve machining thereof as compared to if sled 166 was integral with the rest of lower boom section 106. For example, sled 166 may comprise holes corresponding to pins 172a, 172b, 172c that need to be machined and, by making sled 166 detachable from lower boom section 106, sled 166 may be fit within machinery for creating the holes that may otherwise be difficult to machine were sled 166 permanently affixed to lower boom section 106.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

1. A boom assembly for an aerial device, comprising:
    a lower, non-insulating section;
    an upper, insulating section; and
    a connecting assembly connecting the lower, non-insulating section to the upper, insulating section, comprising:
        a front collar and a rear collar received within the upper, insulating section;
        a structural member having a first plate opposing a second plate, both the first plate and the second plate comprising:
            a lower end coupled to the lower, non-insulating section and an upper end coupled to the upper, insulating section, and
            a front bore and a rear bore located on the upper end, wherein the first plate and the second plate are separated at the upper end by an opening, the opening configured to receive a portion of the upper, insulating section therein; and
a front pin extending through the front bore on the first plate, across the front collar and the upper, insulating section, and through the front bore on the second plate; and
a rear pin extending through the rear bore on the second plate, across the rear collar and the upper, insulating section, and through the rear bore on the second plate.

2. The boom assembly of claim 1, wherein moment loads and shear loads applied to the upper, insulating section are transferred from the upper, insulating section to the front collar and the rear collar, from the front collar and the rear collar to the front pin and the rear pin, respectively, and from the front pin and the rear pin to the structural member.

3. The boom assembly of claim 1, wherein the front collar is pivotable about the front pin.

4. The boom assembly of claim 1,
wherein the upper, insulating section comprises a proximal end coupled to the connecting assembly and a distal end coupled to a boom tip of the boom assembly, and
wherein the distal end comprises a bore receiving at least a portion of the boom tip therein, and at least one fastener at least partially received through the distal end to react to loads applied to the distal end of the upper, insulating section.

5. The boom assembly of claim 1, wherein the front pin is separated from the upper, insulating section by a gap to prevent direct contact between the upper, insulating section and the front pin.

6. The boom assembly of claim 5, wherein the upper, insulating section forms a close fit with the rear pin.

7. The boom assembly of claim 1, further comprising:
a plurality of fasteners extending through the upper, insulating section and at least partially into the rear collar, the plurality of fasteners configured to resist torsional loads and axial loads applied to the upper, insulating section.

8. A connecting assembly for coupling a non-insulating boom section to an insulating boom section on an aerial device, the connecting assembly comprising:
a front collar and a rear collar coupled to the insulating boom section;
a structural member, comprising:
a first plate and a second plate separated by an opening, the opening configured to receive a portion of the insulating boom section therein,
wherein the first plate and the second plate comprise:
an upper end having a front bore and a rear bore, the upper end coupled to the insulating boom section; and
a lower end coupled to the non-insulating boom section; and
a front pin extending through the front bore of the first plate, through the front collar and the insulating boom section, and through the front bore of the second plate; and
a rear pin extending through the rear bore of the first plate, through the rear collar and the insulating boom section, and through the rear bore of the second plate.

9. The connecting assembly of claim 8, wherein the insulating boom section is not in direct contact with the front pin or the rear pin.

10. The connecting assembly of claim 8, wherein the front collar is pivotable about the front pin.

11. The connecting assembly of claim 8, further comprising a plurality of fasteners inserted through the insulating boom section and into the rear collar, the plurality of fasteners configured to resist torsional loads and axial loads from the insulating boom section.

12. The connecting assembly of claim 8, wherein the front collar and the rear collar form a close fit with the insulating boom section.

13. The connecting assembly of claim 8, wherein the front collar and the rear collar are coupled to an exterior surface of the insulating boom section.

14. The connecting assembly of claim 8, wherein the insulating boom section forms a close fit with the rear pin.

15. An aerial device, comprising:
a boom assembly comprising:
a lower boom section;
an upper boom section; and
a connecting assembly connecting the lower boom section to the upper boom section, the connecting assembly comprising:
a structural frame coupled at a lower end to the lower boom section and at an upper end to the upper boom section;
at least one collar coupled to a proximal end of the upper boom section; and
at least one pin extending through the structural frame, the proximal end of the upper boom section, and the at least one collar.

16. The aerial device of claim 15,
wherein the at least one collar comprises a front collar and a rear collar, and
wherein the at least one pin comprises:
a front pin extending through the structural frame, the upper boom section, and the front collar, and
a rear pin extending through the structural frame, the upper boom section, and the rear collar.

17. The aerial device of claim 16, wherein the front collar and the rear collar are coupled to an exterior of the upper boom section.

18. The aerial device of claim 17, wherein moment loads and shear loads applied to the upper boom section are transferred from the upper boom section to the front collar and the rear collar, from the front collar and the rear collar to the front pin and the rear pin, respectively, and from the front pin and the rear pin to the structural frame.

19. The aerial device of claim 15, wherein the upper boom section comprises an insulating material.

20. The aerial device of claim 15, further comprising:
a boom tip coupled to a distal end of the upper boom section,
wherein the distal end comprises a bore, and at least one distal end pin extending through the upper boom section, the boom tip, and the bore to couple the boom tip to the distal end of the upper boom section.

* * * * *